United States Patent
Alexandrov

(10) Patent No.: US 6,819,057 B2
(45) Date of Patent: Nov. 16, 2004

(54) BALLAST SELF OSCILLATING INVERTER WITH PHASE CONTROLLED VOLTAGE FEEDBACK

(75) Inventor: Felix I. Alexandrov, Burlington, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/399,323
(22) PCT Filed: Oct. 30, 2001
(86) PCT No.: PCT/US01/42841
§ 371 (c)(1), (2), (4) Date: Jul. 1, 2003
(87) PCT Pub. No.: WO02/39788
PCT Pub. Date: May 16, 2002

(65) Prior Publication Data
US 2004/0130273 A1 Jul. 8, 2004

Related U.S. Application Data
(60) Provisional application No. 60/244,555, filed on Oct. 31, 2000.

(51) Int. Cl.[7] .................................................. H05B 37/02
(52) U.S. Cl. .................................... 315/209 R; 315/224
(58) Field of Search ............................ 315/209 R, 224, 315/291, 244, 248, DIG. 7, 219, 225

(56) References Cited

U.S. PATENT DOCUMENTS

| | | | |
|---|---|---|---|
| 5,349,270 A | | 9/1994 | Roll et al. ............... 315/209 R |
| 5,717,295 A | * | 2/1998 | Nerone ................... 315/209 R |
| 5,841,239 A | * | 11/1998 | Sullivan et al. ............. 315/219 |
| 5,874,810 A | | 2/1999 | Nerone ....................... 315/248 |
| 5,952,790 A | | 9/1999 | Nerone ................... 315/209 R |
| 6,246,173 B1 | | 6/2001 | Fischer et al. ......... 315/DIG. 7 |
| 6,400,096 B1 | * | 6/2002 | Wells et al. ................. 315/224 |

* cited by examiner

Primary Examiner—Wilson Lee
(74) Attorney, Agent, or Firm—Carlo S. Bessone

(57) ABSTRACT

A self-oscillating ballast inverter circuit for powering a gas discharge lamp. The circuit is used in a ballast inverter to compensate positive resonance frequency shift in the inverter load during lamp starting. The circuit built on low power components and incorporated in a DC to AC inverter, providing transient advance angle for inverter switching transistors (M1, M2). This angle advance is increased in proportion to incremental output inverter voltage that is above a selected threshold voltage. Therefore, the inverter operates above resonance frequency during lamp starting, avoiding transient cross conduction in transistors in the circuit. The feedback circuit limits voltage and current stresses that may destroy some ballast components over time. The circuit also generates a signal for a protection circuit that is activated if the lamp fails to start.

21 Claims, 3 Drawing Sheets

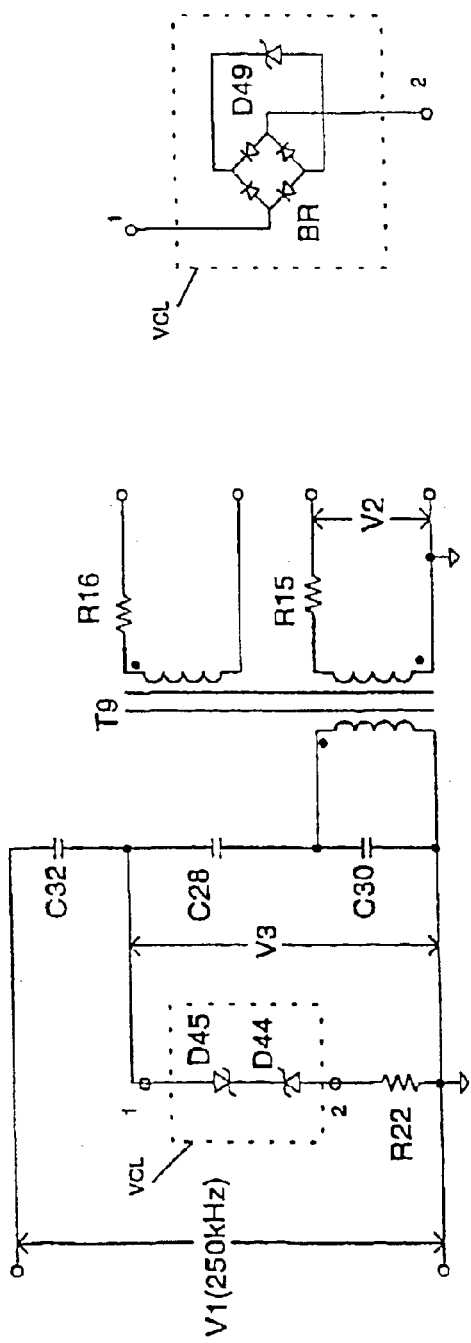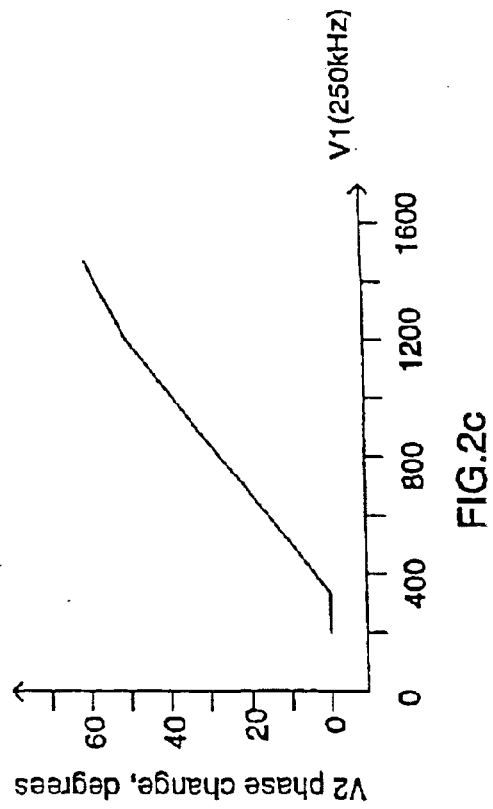
FIG.2a
FIG.2b
FIG.2c

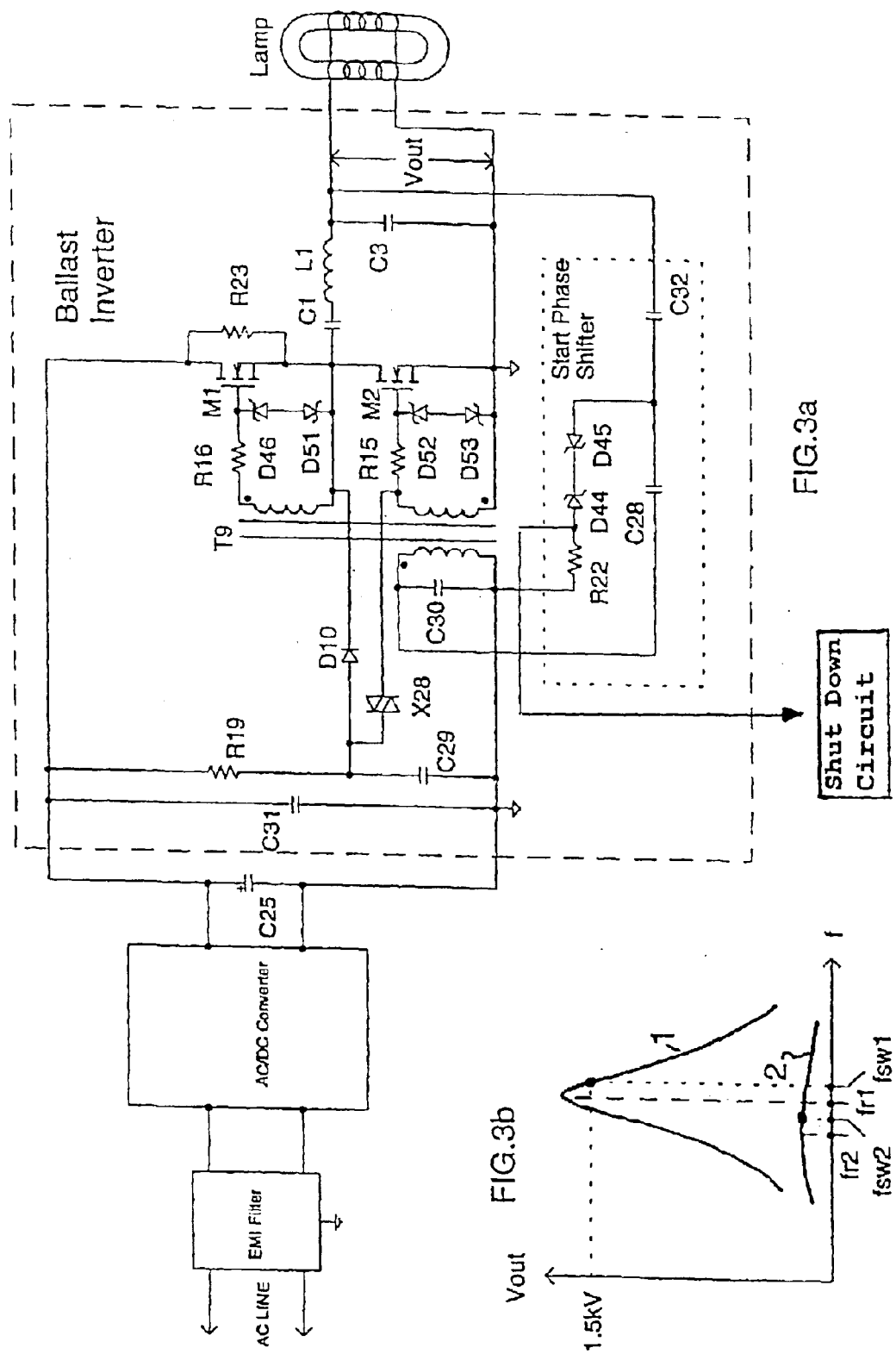

BALLAST SELF OSCILLATING INVERTER WITH PHASE CONTROLLED VOLTAGE FEEDBACK

FIELD OF THE INVENTION

The present invention relates to an electronic ballast, especially a self-oscillating resonant inverter. The ballast is used in a power supply, for example, in a DC to AC inverter for energizing an inductively coupled gas discharge lamp.

BACKGROUND OF THE INVENTION

A gas discharge lamp typically utilizes an electronic ballast for converting AC line voltage to high frequency current powering a gas discharge lamp. The ballast usually includes a resonant inverter converting DC bus voltage to lamp high frequency current. The resonant inverter comprises at least one switching transistor generating high frequency rectangular AC voltage and a resonant load having an inductor and a capacitor in series. The gas discharge lamp is coupled in parallel to the capacitor. For high frequency lamps (up to 2.65 MHz and higher), it is common that a self-oscillating inverter generates high voltage at the resonance frequency for lamp instant starting. It is known that a self-oscillating inverter with a voltage feedback is preferred for electrodeless lamps as is the case with products identified in connection with the marks ICETRON, QL, GENURA, and EVERLIGHT. This self-oscillating inverter utilizes a feedback transformer coupled to the inverter output via a feedback capacitor used for driving inverter switching MOSFETs. By means of the voltage feedback circuit, a sinusoidal voltage across the gates of switching MOSFETs is generated. Therefore, dead time intervals for the switching transistors are automatically formed when crossing near zero gate voltage. This voltage feedback for ballast inverters is described, for instance, in U.S. Pat. No. 4,748,383 issued to Houkes, U.S. Pat. No. 5,962,987 issued to Statnic and U.S. Pat. No. 5,982,108 issued to Buij at al.

It is known in the field that a few factors have important influence on starting transients. First, during lamp starting, when the Q of the resonant load is high, the output ballast voltage is much higher than when the Q of the resonant load is in the steady-state mode. Actual resonant frequency of the parallel loaded resonant circuit is slightly higher when Q is high (before the lamp is lit), than after lamp starting. This factor is neglected in calculations of the resonant frequency, but must be taken into account for a system that runs close to resonance.

Second, lamp and ballast inductors may saturate in one direction during starting by low frequency current components and may increase resonant frequency at these saturation intervals. At constant switching frequency, the resonant load can turn capacitive and the resonant load then operates in a capacitive mode.

Third, during starting, the amplitude of the transistor gate voltage in the self-oscillating inverter is increased. U.S. Pat. No. 5,349,270 issued to Roll et al. teaches clamping gate voltage using a pair of back-to-back connected Zener diodes to limit gate voltage during lamp starting. But, clamping these Zener diodes during lamp starting creates a transient phase delay of the feedback signal that contributes to the capacitive mode of operation mentioned above.

The fourth drawback is a gate voltage slope change during starting of self-generating ballast inverter. During lamp starting the dead time intervals of the switching transistors are reduced, causing an increase in the rms voltage applied to the resonant load and an even higher output ballast voltage.

When the resonant load temporarily changes from an inductive to a capacitive nature by all the above factors acting together, a switching transistor can be turned ON when the body diode of another transistor is conducting resonant load current. This creates a high reverse recovery current in the body diode that will destroy the switching transistor with time (see T. Wu and C. Nguyen, "Dynamic Stresses Can Cause Power MOSFET Failures", PCIM, April 2000, p.28).

In general, the inverter feedback circuit could be tuned up with pre-advanced switching angle, so that the inverter will start the lamp without cross conduction in the MOSFETs. But, this arrangement does not provide the most efficient optimized steady-state mode in the ballast inverter.

FIG. 1a shows a typical, prior art electronic ballast arrangement for, preferably, an electrodeless lamp. This arrangement is effective for converting a standard AC line voltage to high frequency current for driving the lamp. The ballast AC to DC converter derives AC from the power line through an EMI filter, rectifies the AC, and optionally corrects the power factor. The AC to DC converter output voltage is filtered out by an electrolytic capacitor C25 connected across a high voltage DC bus.

The self-generating ballast inverter is connected to the DC bus and its output is connected to the lamp. A high frequency capacitor C31 reduces high frequency voltage ripple on the DC bus. Two switching MOSFETs, designated as M1 and M2, are coupled in series across the DC bus. A resonant load comprises, in series, an inductor L1, a capacitor C3, and the lamp coupled in parallel to the capacitor C3. The resonant load is connected in parallel to the switching MOSFET M2 via a DC blocking capacitor C1. The switching transistors, M1 and M2, are driven by a feedback circuit.

The feedback circuit includes a capacitor C27, a feedback transformer T9, a compensating capacitor C30, coupled in parallel to the transformer T9, and MOSFETs M1 and M2. The gates of M1 and M2 are coupled to secondary windings of the transformer T9 via resistors R16 and R15, respectively. Zener diodes D46 and D51 are connected back-to-back in series and clamp the gate voltage of the transistor M1. Zener diodes D52 and D53 provide clamping for the gate voltage of the transistor M2. Clamping gate voltages helps to protect the feedback transformer T9 from saturation during the lamp starting.

Also, the inverter in FIG. 1a comprises a start circuit with a storage capacitor C29, charged from the DC bus via a resistor R19, a diac X28 for generating a start signal, and a dummy resistor R23 for charging DC blocking capacitor C1 before starting the inverter. A diode D10 discharges the storage capacitor C29 to prevent the inverter from restarting during steady-state operation. Rectangular AC voltage V1 with near to resonant frequency is applied to the resonant load, resulting in sinusoidal voltage Vout across the lamp (see FIG. 1a).

FIG. 1b shows voltage versus frequency plots for the resonant load at a lamp-starting mode 1 and at lamp-lit mode 2 (steady-state). In the conventional prior art circuit of FIG. 1a, the switching frequency fsw is about the same during both modes 1 and 2. But, the resonant frequency fr1 in mode 1 is higher than the resonant frequency fr2 in mode 2 (fr1>fr2 in FIG. 1b). Therefore, if the inverter switches above resonant frequency (fsw>fr2) in optimized zero-voltage-switching (ZVS) mode 2, the inverter may switch below resonant frequency (fsw<fr1) in mode 1 with high reverse recovery currents in the body diode of MOSFETs M1 and M2. Operating points of the inverter in both modes are shown by dots in FIG. 1b.

One way to avoid problems between transient mode and steady-state mode requirements is to use a Phillips 85 W QL electrodeless lamp ballast having a self-generating inverter with an additional feedback circuit. Using a regulated transistor, this feedback circuit has an additional frequency dependent network connected across the feedback transformer. This type of circuit arrangement is described in U.S. Pat. No. 5,550,438 issued to Reijnaerts. However, the voltage limit feedback circuit in the Reijnaerts patent senses only a positive wave of lamp voltage. Thus, the Reijnaerts feedback circuit is not stable enough and also requires too many components, thereby shortening the life of the ballast. Therefore, a need still exists for improving ballast inverters powering electrodeless gas discharge lamps.

SUMMARY OF THE INVENTION

It is an object of the present invention to provide a ballast inverter with a feedback circuit that gradually advances the phase angle of the feedback signal versus lamp voltage, and, correspondingly, corrects switching frequency to avoid cross conduction in inverter switching transistors during lamp starting.

It is another object of the present invention to provide a ballast inverter circuit that incorporates a voltage feedback circuit that can be economically built with readily available passive electronic components.

It is yet another object of the invention to obtain an inverter circuit with limited transistor gate output starting voltage and reduce voltage stress on resonant load components.

It is still another object of the invention to generate a signal that shuts off the inverter if the lamp fails to start or the lamp is damaged.

It is still further an object of the invention to provide a ballast inverter having a life comparable with the relatively long life of an electrodeless gas discharge lamp.

In accordance with the invention, claimed herein, there is provided a ballast inverter circuit comprising a resonant load. When the ballast inverter circuit is used with a gas discharge lamp, the resonant load includes the lamp. The ballast inverter circuit comprises a switch, preferably at least one transistor switch, but more preferably two transistor switches serially connected across the output of a DC power supply, for instance, an AC to DC converter. The resonant load comprises an inductor and resonant capacitor connected in series between a common node of the transistor switches and an output terminal of the DC power supply, via a DC capacitor. The lamp is coupled in parallel to the resonant capacitor.

The ballast inverter circuit also comprises a voltage feedback circuit and a start circuit. The voltage feedback circuit includes a feedback transformer having a primary winding coupled to the inverter output via two series feedback capacitors. Each secondary winding controls a MOSFET switch through its gate network. A bi-directional voltage clamp is connected in series with a phase shift resistor and this series circuit is connected in parallel to the primary winding and the feedback capacitor connected in series.

BRIEF DESCRIPTION OF THE DRAWINGS

The present invention will be explained in more detail with reference to the attached drawings in which:

FIG. 2a is a schematic diagram of a phase shifter.

FIG. 2b is a schematic diagram of an alternate embodiment of a voltage clamp for a phase shifter.

FIG. 2c is a plot of output voltage phase change versus input voltage for the phase shifter of FIG. 2a.

FIG. 3a is a schematic diagram of the ballast inverter with a phase-controlled voltage feedback circuit according to the first embodiment.

FIG. 3b is a plot of output voltage versus frequency for the inverter in FIG. 2a, illustrating operation in starting and steady-state modes.

DETAILED DESCRIPTION OF THE INVENTION

The present invention will be explained in more detail with reference to the attached drawings in which like numerals represent like elements.

In FIG. 2a, a voltage feedback circuit for a ballast inverter circuit is presented that couples ballast output voltage V1 to gate networks of the inverter switching FETs. The feedback circuit provides an output signal of the right magnitude and phase for supporting free oscillations in the inverter. The feedback circuit comprises a feedback transformer T9 with a primary winding and two secondary windings driving inverter FETs (not shown in FIG. 2a), via gate networks having resistors R15 and R16. A compensation capacitor C30 is connected across the primary winding for adjusting the phase of output voltage V2. The primary winding is coupled to the lamp via serial capacitors C28 and C32. A serial network built with a bi-directional voltage clamp VCL and a resistor R22 is connected across the serial capacitor and the primary winding coupled together. The bi-directional clamp circuit is formed with two back-to-back connected Zener diodes D44 and D45.

The bi-directional clamp circuit can also be formed with a diode bridge BR and a single Zener diode D49 (see FIG. 2b), or by other means known in the field, to avoid the influence of Zener diode capacitance for very high frequency ballasts. When the lamp voltage V1 (not shown in FIG. 2a) is low (assuming steady-state mode), the amplitude of Zener diode voltage is below its threshold and the clamp circuit is open (some leakage current caused by parasitic capacitance of serial Zener diodes can be neglected).

Figure 1A:
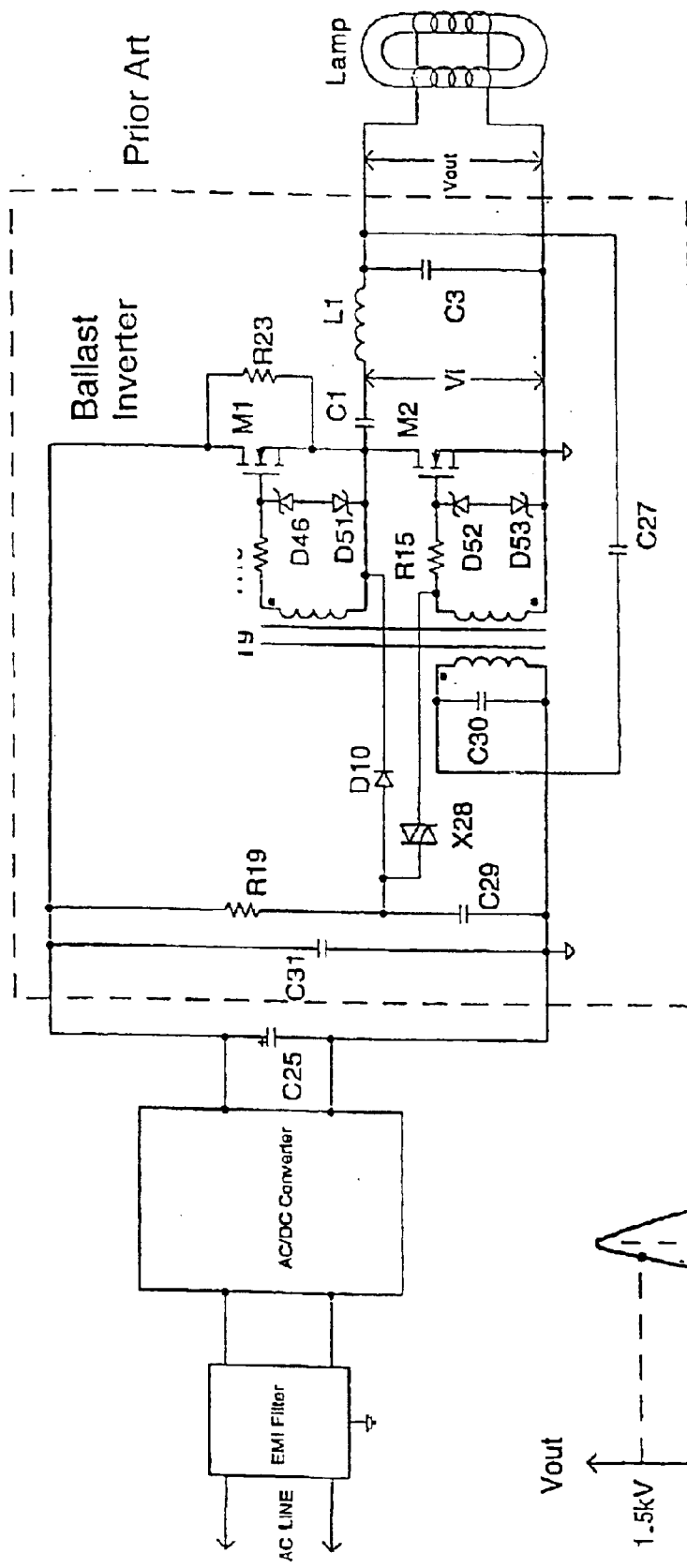
FIG. 1a is a schematic diagram of a conventional ballast inverter with a voltage feedback loop.

Therefore, in the above mode, the feedback circuit is equivalent to and operates in the same way as the feedback circuit in the conventional prior art inverter shown in FIG. 1a. Voltage V3 across the serial network of D44, D45 and R22 is in phase with input voltage V1. During lamp starting, when voltage V1 is high, the Zener diodes D44 and D45 will conduct current to the resistor R22. As soon as V1>>Vz, the bi-directional voltage clamp VCL may be considered as a switch. By connection of the resistor R22 to the feedback network, voltage V3 advances input voltage Vin and creates advanced phase shift for output voltage V2. When input voltage V1 gradually changes from low to high, starting from the level determined by voltage clamp threshold Vz, the phase angle of the output signal also advances gradually (see FIG. 2c).

In FIG. 3a, an application of the voltage feedback circuit of FIG. 2a is demonstrated in a conventional ballast inverter with a voltage feedback. The ballast in FIG. 3a comprises a ballast AC to DC converter that derives AC from the power line through an EMI filter, rectifies the Ac, and optionally corrects the power factor. The AC to DC converter output voltage is filtered out by an electrolytic capacitor C25 connected across a high voltage DC bus. The self-generating ballast inverter is connected to the DC bus and its output is connected to the lamp. A high frequency capacitor C31 reduces high frequency voltage ripple on the DC bus.

Two series switching MOSFETs, M1 and M2, are coupled across the DC bus. A resonant load comprises an inductor L1, a capacitor C3, connected in series, and the lamp coupled in parallel to the capacitor C3. The resonant load is connected in parallel to the switching MOSFET M1 via a DC blocking capacitor C1. The switching transistors M1 and M2 are driven by a feedback circuit. The feedback circuit includes a feedback transformer T9, a compensating capacitor C30, coupled in parallel to the transformer T9, and MOSFETs M1 and M2. The gates of M1 and M2 are coupled to secondary windings of the transformer T9 via resistors R16 and R15, respectively. Zener diodes D46 and D51 are connected back-to-back in series and clamp the gate voltage of the transistor M1. Zener diodes D52 and D53 provide clamping for the gate voltage of the transistor M2. As stated above, clamping gate voltages helps to protect the feedback transformer T9 from saturation during the lamp starting. Also, the inverter in FIG. 3a comprises a start circuit with a storage capacitor C29, charged from the DC bus via a resistor R19, a diac X28 for generating a start signal, and a dummy resistor R23 for charging DC blocking capacitor C1 before starting the inverter. A diode D10 discharges the storage capacitor C29 to prevent the inverter from restarting during steady-state operation.

The invention is not limited to the MOSFET gate drive circuit shown in FIG. 3a. It can be applied to other variations of the voltage feedback inverter with different switches or transistor drive networks.

Figure 1B:
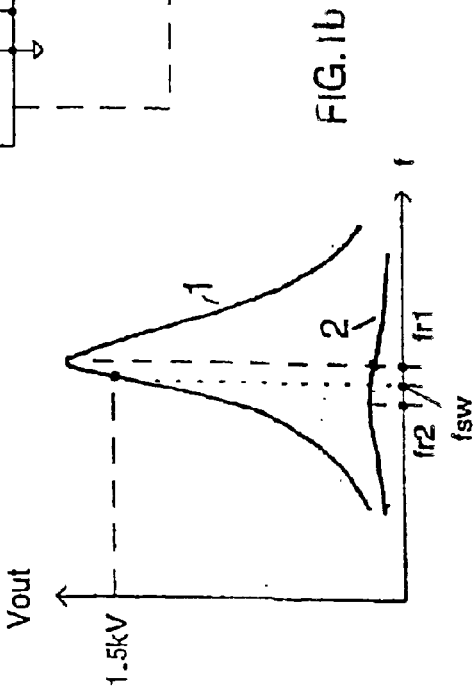
FIG. 1b is a plot of output voltage versus frequency for the inverter in FIG. 1a, illustrating operation in starting mode and steady-state mode.

The operation of the ballast inverter can be better understood from the output voltage versus frequency plots in FIG. 3b. The plot of mode 1 corresponds to the resonant load during lamp starting, until the lamp is lit. In this mode, Start Phase Shifter (FIG. 3a) turns off switching transistors M1 and M2 earlier and the switching frequency has a tendency to increase. As the ballast output voltage increases, the inverter switching frequency also increases. Therefore, the switching frequency fsw1 exceeds the resonant load frequency fr1 at starting (fsw1>fr1), so that the inverter starts with an inductive load (compare the operating dot in mode 1 with prior art inverter plot in FIG. 1b), without cross conduction in the MOSFETs. The Start Phase Shifter will not only compensate for a frequency increase of the resonant load, but also any additional phase delays caused by clamping the MOSFET gates.

When the lamp is lit, the resonant load plot changes from mode 1 to mode 2, output voltage Vout is decreased, and the resonant frequency of the resonant load decreases from fr1 to fr2. Accordingly, the amplitude of voltage across clamping Zener diodes D44 and D45 falls below its threshold, and the switching frequency decreases from fsw1 to fsw2. With the lamp lit, the ballast inverter operates in optimized mode designated by a dot on plot 2, that is above and close to resonant frequency fr2, that is, with possible minimum currents in the body diodes of the MOSFETs and zero voltage switching.

During lamp starting, the clamping Zener diodes and the resistor R22, as well as many of the ballast components, are exposed to pulse power that can exceed their rated power. This is possible because the starting time of the lamp is relatively short. If the lamp does not start, a ballast shut-down circuit connected to resistor R22 shuts down the inverter. The shut-down circuit senses an AC voltage signal across resistor R22, rectifies the AC signal and provides a time delay to an inverter shut-down switch to shut off the inverter and protect the ballast components that are exposed to pulse power that can exceed their rated power. When the lamp lights during a given lamp lighting time interval, the AC voltage across R22 drops to zero and the shut-down circuit is not activated.

While the present invention has been described with reference to the particular illustrative embodiment, it is not to be restricted by that embodiment but only by the appended claims. It is to be appreciated that those having ordinary skill in the art can change or modify the embodiments without departing from the scope and spirit of the invention.

What is claimed is:

1. A self-oscillating ballast inverter circuit for a discharge lamp comprising:
    at least one input terminal adapted for connection to a DC voltage source;
    at least one switch connected across the DC voltage source;
    a resonant load connected to the at least one switch;
    a lamp connector connected to the resonant load;
    a feedback transformer having a primary winding, the feedback transformer having a secondary winding corresponding to each said at least one switch, each said secondary winding being connected to a control terminal of a respective said at least one switch; and
    a start phase shifter circuit connected between the resonant load circuit and the primary winding of the feedback transformer, a first branch of the start phase shifter circuit being connected between the resonant load and a first terminal of the primary winding, a second branch of the start phase shifter circuit being connected between a node of the first branch and a second terminal of the primary winding.

2. The self-oscillating ballast inverter circuit according to claim 1, wherein the second branch comprises at least one element adapted to conduct at greater than a leakage current only if a voltage of the resonant load is greater than a threshold level.

3. The self-oscillating ballast inverter circuit according to claim 1, wherein the first branch comprises a set of passive electronic components.

4. The self-oscillating ballast inverter circuit according to claim 3, wherein the set of passive electronic components comprise a first capacitor and a second capacitor connected in series, the first capacitor having a first end connected to the resonant load, the second capacitor having a first end connected to the first terminal of the primary winding.

5. The self-oscillating ballast inverter circuit according to claim 2, wherein the second branch comprises a set of series electronic components.

6. The self-oscillating ballast inverter circuit according to claim 5, wherein the set of series electronic components comprise a phase shift switch, said phase shift switch being closed in a start-up mode of the inverter circuit and being open in a steady-state mode of the inverter circuit.

7. The self-oscillating ballast inverter circuit according to claim 5, wherein the set of series electronic components comprises a resistor.

8. The self-oscillating ballast inverter circuit according to claim 6, wherein the phase shift switch comprises a bi-directional threshold arrangement.

9. The self-oscillating ballast inverter circuit according to claim 8 wherein the bi-directional threshold arrangement comprises a network of Zener diodes connected in opposite orientation to one another.

10. The self-oscillating ballast inverter circuit according to claim 8, wherein the bi-directional threshold arrangement comprises a diode bridge and at least one Zener diode connected to an output of the diode bridge.

11. The electronic ballast circuit according to claim 7, further comprising a ballast shut-down circuit connected in parallel to the resistor.

12. A self-oscillating ballast inverter circuit for a discharge lamp comprising:

at least one input terminal adapted for connection to a DC voltage source;

a first and a second MOSFET connected across the DC voltage source;

a resonant load connected to the first and second MOSFET;

a lamp connector connected to the resonant load;

a feedback transformer having a primary winding connected across the DC voltage source and having a first secondary winding connected to a gate of the first MOSFET and a second secondary winding connected to a gate of the second MOSFET; and a start phase shifter circuit connected between the resonant load circuit and the primary winding, a first branch of the start phase shifter circuit being connected between the resonant load and a first terminal of the primary winding, a second branch of the start phase shifter circuit being connected between a node of the first branch and a second terminal of the primary winding, wherein the second branch comprises at least one element adapted to conduct at greater than a leakage current only if a voltage of the resonant load is greater than a threshold level.

13. The self-oscillating ballast inverter circuit according to claim 12, wherein the first branch comprises a first capacitor connected in series with a second capacitor, the first capacitor having a first end connected to the resonant load, the second capacitor having a first end connected to the first terminal of the primary winding, and wherein the second branch comprises a set of series electronic components.

14. The self-oscillating ballast inverter circuit according to claim 13, wherein the set of series electronic components comprises a phase shift switch, said phase shift switch being closed in a start-up mode of the inverter circuit and being open in a steady-state mode of the inverter circuit.

15. The self-oscillating ballast inverter circuit according to claim 13, wherein the set of series electronic components comprises a resistor.

16. The self-oscillating ballast inverter circuit according to claim 14, wherein the phase shift switch comprises a bi-directional threshold arrangement.

17. The self-oscillating ballast inverter circuit according to claim 16 wherein the bi-directional threshold arrangement comprises a network of Zener diodes connected in opposite orientation to one another.

18. The self-oscillating ballast inverter circuit according to claim 16, wherein the bi-directional threshold arrangement comprises a diode bridge and at least one Zener diode connected to an output of the diode bridge.

19. A method of controlling the switching frequency of a self-oscillating ballast inverter circuit driving a load including a gas discharge lamp, comprising the steps of:

controlling a switching frequency of the inverter to be greater than a resonance frequency of the load during lamp starting; and controlling the switching frequency of the inverter to be greater than a resonance frequency of the load during steady-state operation of the lamp;

wherein the resonance frequency of the load during lamp starting is greater than the switching frequency during lamp steady-state operation.

20. A self-oscillating ballast inverter circuit for a discharge lamp comprising:

first and second DC voltage input terminals;

means for alternately connecting the first and second DC voltage input terminals to a resonant load;

a lamp connector connected to the resonant load;

means for controlling a switching frequency of the means for alternate connection so that the switching frequency is greater than a resonance frequency of the resonant load and a lamp connected to the lamp connector during lamp starting and so that the switching frequency is greater than a resonance frequency of the resonant load and a lamp connected to the lamp connector during steady-state operation of the lamp;

wherein the resonance frequency of the resonant load and the lamp during lamp starting is greater than the switching frequency during lamp steady-state operation.

21. The self-oscillating ballast inverter circuit according to claim 20, further comprising a means for disabling the inverter.

* * * * *